US012716276B2

(12) United States Patent
Orzech et al.

(10) Patent No.: US 12,716,276 B2
(45) Date of Patent: Aug. 25, 2026

(54) MOTOR VEHICLE LOCK

(71) Applicant: Kiekert Aktiengesellschaft, Heiligenhaus (DE)

(72) Inventors: Udo Orzech, Velbert (DE); Heiko Hemmer, Essen (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 0 days.

(21) Appl. No.: 19/100,977

(22) PCT Filed: Jul. 19, 2023

(86) PCT No.: PCT/DE2023/100530
§ 371 (c)(1),
(2) Date: Feb. 4, 2025

(87) PCT Pub. No.: WO2024/032844
PCT Pub. Date: Feb. 15, 2024

(65) Prior Publication Data

US 2026/0049507 A1 Feb. 19, 2026

(30) Foreign Application Priority Data

Aug. 9, 2022 (DE) .................... 10 2022 119 991.6

(51) Int. Cl.
*E05B 85/26* (2014.01)

(52) U.S. Cl.
CPC .................................. *E05B 85/26* (2013.01)

(58) Field of Classification Search
CPC ...................................................... E05B 85/26
USPC ........................................................ 292/194
See application file for complete search history.

(56) References Cited

U.S. PATENT DOCUMENTS 6,053,542 A * 4/2000 Ostrowski ............... E05B 79/20 292/216
6,109,674 A * 8/2000 Bartel ..................... E05B 81/06 292/216
6,497,436 B1 * 12/2002 DeBlock ................ E05B 81/06 292/201

(Continued)

FOREIGN PATENT DOCUMENTS

DE 19942360 C2 4/2001
DE 102008048711 A1 3/2010

(Continued)

OTHER PUBLICATIONS

International Search Report mailed Dec. 4, 2023, for International Application No. PCT/DE2023/100530.

*Primary Examiner* — Nathan Cumar
(74) *Attorney, Agent, or Firm* — Renner, Otto, Boisselle & Sklar, LLP

(57) ABSTRACT

The invention relates to a lock (1) for a motor vehicle, in particular a tailgate lock, comprising a locking mechanism (2) consisting of a rotary latch (3) and at least one pawl (4, 5), wherein the rotary latch (3) can be latched in a pre-latching position and in a main latching position, a pre-latching pawl (4) and a main latching pawl (5), wherein a pre-latching element (17) of the locking mechanism (2) is formed by an angled region of a metal main body (18) of the rotary latch (3), and wherein the angled region (17) can be placed in engagement with a closing pawl (25) of a closing device (23).

14 Claims, 2 Drawing Sheets

(56) References Cited

U.S. PATENT DOCUMENTS

| | | | | |
|---|---|---|---|---|
| 6,511,106 | B2 * | 1/2003 | Perkins | E05B 81/34 292/216 |
| 6,969,023 | B2 * | 11/2005 | Weller | B60R 22/36 242/383.2 |
| 7,275,771 | B2 * | 10/2007 | Crotti | E05B 81/06 292/201 |
| 7,905,523 | B2 * | 3/2011 | Stefanic | E05B 17/0004 292/216 |
| 8,757,682 | B2 * | 6/2014 | Scholz | E05B 81/20 292/216 |
| 8,894,103 | B2 * | 11/2014 | Shibayama | E05B 81/20 292/216 |
| 8,894,106 | B2 * | 11/2014 | Vazquez | E05B 81/68 292/201 |
| 2010/0289274 | A1 * | 11/2010 | Shafry | E05B 85/26 292/194 |
| 2011/0127780 | A1 * | 6/2011 | Barth | E05B 85/243 292/213 |
| 2018/0252004 | A1 * | 9/2018 | Bishop | E05B 81/18 |

FOREIGN PATENT DOCUMENTS

| | | | |
|---|---|---|---|
| DE | 202008015789 | U1 | 4/2010 |
| DE | 102009026921 | A1 | 12/2010 |
| DE | 102012207443 | A1 | 11/2013 |
| DE | 102018116285 | A1 | 1/2020 |

* cited by examiner

MOTOR VEHICLE LOCK

This application is a national phase of International Application No. PCT/DE2023/100530 filed Jul. 19, 2023, which claims priority to German Application No. 10 2022 119 991.6 filed Aug. 9, 2022, each of which is hereby incorporated herein by reference in its entirety.

FIELD OF DISCLOSURE

The invention relates to a lock for a motor vehicle having a locking mechanism consisting of a rotary latch and at least one pawl, wherein the rotary latch can be latched in a pre-latching position and in a main latching position, a pre-latching pawl and a main latching pawl, wherein a pre-latching element of the locking mechanism is formed by an angled region of a metal main body of the rotary latch.

BACKGROUND OF DISCLOSURE

Locks or locking devices for motor vehicles are used where pivoting or sliding components on the motor vehicle must be secured in their position. To secure the position of the components, the locking device works together with a lock holder, wherein a locking mechanism of the locking device is moved into a locked position by a relative movement of the locking device to a lock holder. Areas of application for these locks include flaps, doors and sliding doors, but also, for example, backrest locks for rear bench seats in vehicle interiors. The invention preferably relates to a lock for a tailgate of a motor vehicle.

In order to increase the comfort of the aforementioned locking devices, the locking systems are designed as electrically operated locking systems. Electrically operated locking systems use electric motors that enable a locking mechanism to be unlocked and thus enable electrical opening of the lock. In combination with, for example, a motor-operated tailgate, the operator can open the tailgate via radio remote control without having to intervene manually at the vehicle. In addition to the electrical unlocking of the locking mechanism, so-called closing devices are also used. The closing devices make it possible for a tailgate, or also a side door, once opened to be moved into its final closed position with electrical support.

In order to provide this automatic closing process, the lock must be able to be moved into its final closing position. The lock according to the invention comprises a locking mechanism with a rotary latch and at least one pawl. The rotary latch is pivotably mounted on a metal lock plate and can interact with a lock holder or lock holder bracket attached to the vehicle via an inlet area. When the lock or flap or door is closed, the rotary latch is moved from an open position to a first closed position by the relative movement of the lock holder, which is usually permanently mounted on the vehicle.

In a first closed position, which is called the pre-latching position, a pawl engages the rotary latch in such a way that the movement of the rotary latch is blocked. The rotary latch cannot be opened again without moving the pawl. In order to move the rotary latch from this pre-latching position to a main latching position, closing aids are used. These closing devices interact with the locking mechanism in such a way that the rotary latch is transferred from the locked pre-latching position to a main latching position. In other words, the rotary latch is electrically assisted to move further into its closed position. The closing device moves the rotary latch into the main latching position, in which a pawl, or the same pawl, again engages with the rotary latch and locks the rotary latch in its main latching position. The rotary latch is then in the end position and the door or flap is in its final closed position.

In order to be able to safely reach the main latching position, the rotary latch is moved into an overtravel position by means of the closing device. Overtravel position means that the rotary latch is moved further into the closed position than is necessary for the main latching pawl to engage. By moving the rotary latch into the overtravel position, it is possible to ensure that the main latching pawl is securely locked or latched in the rotary latch. This is particularly necessary because it must be ensured that the locking mechanism engages securely in the main latching position even when the door or flap is closed electrically.

As described above, a pawl must interact with the rotary latch to achieve the pre-latching position and the main latching position. In this case, only one pawl can interact with the rotary latch or two or more pawls can be used, which for example interact with the rotary latch at different levels. It is also known that, for example in a main latching position of the locking mechanism, there is an opening moment in the locking mechanism, wherein the opening moment refers to a force by which the pawl is forced out of the latching position. In order to prevent the locking mechanism from unlocking itself in this case, the pawl is additionally secured in the latching position by means of a latching or blocking lever.

From DE 20 2008 015 789 U1, a lock for a motor vehicle is known having a closing and opening device with a drive, a transmission element and a drive pawl and with a locking mechanism and a stop for the locking mechanism, wherein the drive works on the drive pawl with the interposition of the transmission element in order to close the locking mechanism and/or to facilitate opening. Starting from a pre-latching position of the locking mechanism, the locking mechanism can be transferred to a main latching position by means of the closing device. For this purpose, a transmission lever is provided which is pivotably mounted on the rotary latch axis and which in turn supports the drive pawl. The drive pawl engages a closing stop of the rotary latch to close the locking mechanism and is thus able to move the rotary latch with the aid of an external drive and a Bowden cable connected to the external drive. An ejector lever is provided to decouple the drive pawl from the rotary latch, wherein the ejector lever acts directly on the drive pawl and moves the drive pawl out of the engagement region with the rotary latch.

SUMMARY OF DISCLOSURE

The object of the invention is to provide an improved lock for a motor vehicle. In particular, it is an object of the invention to provide a compact locking system with a high level of functionality with the smallest possible number of components.

According to the invention, the object is achieved by the features of independent claim 1. Advantageous embodiments of the invention are specified in the dependent claims. It should be noted that the exemplary embodiments described below are not restrictive; rather, any variation of the features described in the description and the dependent claims is possible.

According to claim 1, the object of the invention is achieved in that a lock for a motor vehicle is provided comprising a locking mechanism with a rotary latch and at least one pawl, wherein the rotary latch can be locked in a pre-latching position and in a main latching position, a main latching pawl and a pre-latching pawl, wherein a pre-latching element of the locking mechanism is formed by an angled region of a metal main body of the rotary latch, and wherein the angled region can be placed in engagement with a closing pawl of a closing device. The inventive design of the motor vehicle lock now makes it possible to realize a compact design of a motor vehicle lock in which a high level of functionality can be achieved with a small number of components. In particular, by using the angled region of the metal main body of the rotary latch as a pre-latching element and at the same time as a means of implementing a closing device for the locking mechanism, further components, molded-on parts, and/or structural means for introducing a force to close the locking mechanism can be omitted.

The closing device thus interacts directly with the rotary latch and in particular with the engagement surface on the rotary latch, which is also used to realize the pre-latching position in the vehicle lock. The angled region on the rotary latch therefore has a dual function. On the one hand, the angled region can be used to realize a first locking position when closing the locking mechanism and, at the same time, the closing pawl can access the angled region in order to realize the complete closing and reaching of the main latching position of the locking mechanism. Consequently, a high level of functionality can be provided in the motor vehicle lock with minimal constructive means.

The lock according to the invention can be a lock for a tailgate, a side door, a flap or cover, but also for example for a seat back of a rear bench seat of a vehicle. Preferably, however, the invention relates to a lock for a tailgate of a motor vehicle. Special requirements are placed on the tailgate locks because, in contrast to sliding door locks, for example, they can be exposed to changing loads. For example, it may happen that the tailgate is loaded with snow, so that when opening it, and in particular when opening it electrically, it must be ensured that the lock is fully open until the loaded flap is closed again. For example, if a tailgate is loaded with snow, the locking mechanism may be opened electrically, but the lock holder engaging with the rotary latch does not cause any relative movement in the locking mechanism because the tailgate remains in its position due to the heavy load. In this case, the pawl or pawls must be held out of engagement with the rotary latch. Keeping the pawl disengaged when the locking mechanism is unlocked is also called the snow load function.

Regarding the structure of the locking mechanism, please refer to the introductory explanations. The rotary latch has a metal main body which is pivotably mounted in the vehicle lock via a likewise metal axis. The pivot axis of the rotary latch, as well as the pawl or pawls, is also held in a metal lock case. This metallic basic structure of the motor vehicle lock ensures that the pivoting or movable component on the motor vehicle can be held securely even in extreme situations, such as an accident. In the pre-latching and main latching positions, the metal regions of the pawl and the rotary latch are in contact with one another in order to ensure secure latching and, in particular, positionally accurate latching of the locking mechanism.

According to the invention, an angled region is provided on the metal main body of the rotary latch, wherein the angled region preferably has an angle of 90° to the base surface of the rotary latch and extends beyond the flat extension of the rotary latch. The angled region thus forms a one-piece component with the rotary latch and engages with the pre-latching pawl.

In an advantageous embodiment of the invention, the closing latch is pivotably mounted on a stationary closing aid. The closing pawl acts directly on the angled region of the metal main body of the rotary latch and is mounted in a closing aid arranged in a fixed position in the motor vehicle lock in such a way that a transfer of a closing force from a pre-latching element to a main latching element is possible. By connecting to the closing lever, it is possible to influence the closing forces and to influence the closing forces with regard to the design of the closing lever. Increased forces occur, particularly when the main latching position or the overtravel position is fully reached, and these forces increase continuously during the closing process.

This is particularly due to the seal arranged between the moving component and the body. In order to achieve a complete seal against moisture, but also with regard to noise minimization, a seal, in particular a door or flap seal, is arranged between the component movably arranged on the motor vehicle and the body. The closing device must move the rotary latch against this sealing pressure, which occurs when the seal is compressed. By means of the relative movement between the rotary latch and the lock holder, the closing force is introduced into the movable component. Sealing pressures of up to 500 N can occur here, which must be transferred to the lock holder via the closing device and the locking mechanism. Due to the advantageous mounting of the closing latch on a closing lever, the force to be introduced into the locking mechanism can be varied depending on the size of the seal. In particular, the direct connection between the closing latch and the angled region ensures a safe transfer of force to the rotary latch.

It can also be advantageous if the closing latch can be actuated by means of at least one locking mechanism part. In order to further reduce the number of components, the invention proposes that the locking mechanism parts themselves can be brought into engagement with the closing pawl. As a result, no additional components are required to actuate, or couple or uncouple, the closing latch. Consequently, a closing in the vehicle lock can be achieved with the smallest possible number of components. The locking mechanism parts are actuated to unlock the locking mechanism so that the closing latch can also be moved out of the region of engagement with the rotary latch. This reduces the number of required components of the vehicle lock to a minimum, which offers not only structural advantages, but also weight and cost advantages.

In a particularly advantageous manner, the closing pawl can be actuated by means of the pre-latching pawl. In order to open the locking mechanism, the pre-latching pawl as well as the main latching pawl must be disengaged from the rotary latch so that the rotary latch can move in its opening direction and thus release the lock holder. If the pre-latching pawl is now moved with a release lever, the release lever can be used to move both the pre-latching pawl and the main latching pawl in order to disengage the pawls from the rotary latch. If the pre-latching pawl now interacts with the closing pawl, the closing pawl can be moved out of engagement with the angled region, or movement path of the angled region, of the rotary latch by means of the pre-latching pawl. The pre-latching pawl therefore has an additional function, namely the function of decoupling the closing device from the rotary latch.

In a further embodiment of the invention, the closing pawl has a driver, wherein the driver projects into a movement region of the front latching pawl. The pre-latching pawl is usually flat in design, and more preferably is in a plane parallel to the angled region of the rotary latch. The main latching pawl is arranged in the same plane as the rotary latch, i.e. the main body of the rotary latch, and also engages the main latching element of the rotary latch in the same plane as the main body of the rotary latch. To achieve this, the pre-latching pawl is arranged parallel to the main latching pawl and the main body of the rotary latch, but in a plane above the main latching pawl and the rotary latch. The pre-latching pawl engages in the angled region of the main body of the rotary latch. The angled region of the metal main body of the rotary latch here protrudes so far beyond the main body of the rotary latch that both the pre-latching pawl and the closing pawl can engage in the angled region. The closing pawl is advantageously also pivotally mounted parallel to the pre-latching pawl in the motor vehicle lock, but can preferably pivotally move in a plane spaced at a distance. The driver is arranged on the closing pawl and is preferably manufactured in one piece with the closing pawl. Since no closing forces have to be transferred to the rotary latch by the driver, the driver can alternatively also be made from a plastic coating of the closing latch. Preferably, however, the closing latch is made in one piece from a metal material, preferably steel.

The pre-latching pawl preferably has a driving contour for the closing pawl. The closing pawl can be moved out of the engagement region with the rotary latch by means of the pre-latching pawl. In the unlocked position of the locking mechanism, the main latching pawl and the pre-latching pawl are located at such a distance from the range of motion of the rotary latch that the rotary latch can pivot freely. By means of the driving contour on the pre-latching pawl, the closing pawl is held at such a distance from the angled region of the rotary latch that a free pivoting of the rotary latch or of the angled region is also possible. The pre-latching pawl thus indirectly controls the closing process.

This is also evident in the preferred embodiment in which the closing pawl is held out of engagement with the rotary latch by means of the pre-latching pawl. The front pawl therefore has the dual function of enabling the locking mechanism to be locked in the pre-latching position and, in addition, controlling the position of the closing pawl in relation to the rotary latch. This means that a motor vehicle lock with a closing function can be realized with a minimal number of components. The driving contour is designed in such a way that when the pre-latching pawl is disengaged, the closing pawl is also disengaged from the region of engagement with the rotary latch, in particular the beveled portion of the rotary latch.

Advantageously, the pre-latching pawl can be actuated independently of the main latching pawl. The pre-latching pawl has a driving function for the closing pawl. Furthermore, the pre-latching pawl can be actuated independently of the main latching pawl and is able to move independently of the main latching pawl. If the main latching pawl is brought into contact with the rotary latch when the locking mechanism is closed, the main latching pawl as well as the pre-latching pawl are spring-loaded in the direction of the rotary latch. If the beveled region of the rotary latch now engages with the pre-latching pawl so that a pre-latching position of the locking mechanism is achieved, the pre-latching pawl can move independently of the main latching pawl in the direction of the rotary latch, whereby on the one hand the locking mechanism assumes the pre-latching position and at the same time the closing pawl engages with the angled region of the rotary latch. Consequently, the initiation of the closing process accords with reaching the pre-latching position. The closing latch is in engagement with the angled region of the rotary latch so that the closing process can be started. By a movement of the pre-latching pawl, the closing process can be interrupted, in the sense that the driver on the closing pawl is brought out of engagement with the angled region by the pre-latching pawl.

Advantageously, the pre-latching pawl also makes it possible to unlock the locking mechanism and release the closing pawl from the region of engagement with the rotary latch. The pre-latching pawl is also used to unlock the locking mechanism, not only from the pre-latching position but also from the main latching position. For this purpose, in this advantageous variant embodiment the pre-latching pawl also acts on the main latching pawl. For this purpose, for example a further driver can be arranged on the pre-latching pawl so that the pre-latching pawl can move the main latching pawl out of the region of engagement with the rotary latch. The pre-latching pawl therefore has a central function in the vehicle lock. On the one hand, the pre-latching pawl controls the closing process and enables the closing process, and on the other hand the pre-latching pawl can be used to initiate the unlocking of the locking mechanism. Consequently, by means of the pre-latching pawl the pre-latching position can be assumed when the locking mechanism is closed, the closing pawl can be brought into engagement with the rotary latch, an interruption of the closing process can be initiated and, in the event of the locking mechanism being opened, the closing pawl can be brought out of engagement with the rotary latch, the main latching pawl can be actuated, and thus a complete exposure of the rotary latch can be initiated in order to move the rotary latch and release the lock holder.

BRIEF DESCRIPTION OF DRAWINGS

The invention is explained in more detail below with reference to the accompanying drawings on the basis of a preferred exemplary embodiment. However, the principle applies that the embodiment does not limit the invention, but is merely an advantageous embodiment. The features depicted can be implemented individually or in combination with further features of the description as well as what is claimed-individually or in combination.

In the figures.

DETAILED DESCRIPTION

Figure 1:
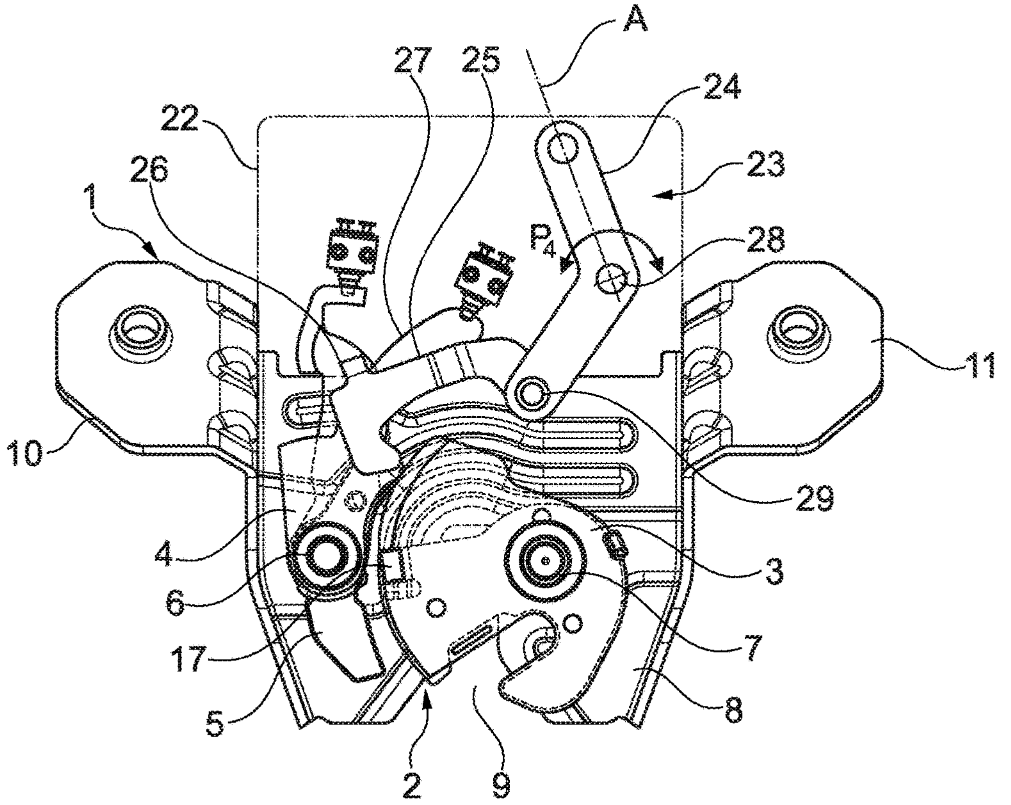
FIG. 1 is a plan view of a motor vehicle lock designed according to the invention in an open position, wherein only the necessary components of the motor vehicle lock belonging to the invention are shown.

FIG. 1 shows a motor vehicle lock 1 in a plan view of a locking mechanism 2 in an open, i.e. unlocked position. The locking mechanism has a rotary latch 3, a pre-latching pawl 4 and a main latching pawl 5.

The locking mechanism parts 3, 4, 5 are pivotably mounted in a lock case 8 by means of axes 6, 7. The lock case 8 has an inlet area 9 through which a lock holder (not shown) can interact with the rotary latch 3 in a known manner. The lock case 8 also has bevels 10, 11, by means of which the motor vehicle lock 1 can be fastened to a motor vehicle or a body of the motor vehicle. For the explanation of the invention, only some components of the motor vehicle lock 1 are shown that are essential for explaining the invention. The pawls 4, 5 have extensions 12, 13, which can each be brought into engagement with a switching means 14, 15. The switching means 14, 15 are shown in FIG. 1 in an actuated position; in other words, the extension 12 of the pre-latching pawl actuates the switching means 14 and the extension 13 of the main latching pawl 5 actuates the switching means 15. In this variant embodiment, both switching means 14, 15 are designed as microswitches and are shown actuated.

FIG. 1 shows an unlocked position of the locking mechanism 2, so that the rotary latch 3 is able to move in the direction of the arrow P, i.e. counterclockwise. The movement of the rotary latch 3 is effected by a rotary latch spring (not shown), which loads the rotary latch 3 in the direction of the arrow P, and by a sealing pressure exerted by a tailgate on the vehicle lock or the lock holder. In this open position, the rotary latch is able to release the lock holder and a tailgate can be opened. The axes 6, 7 of the locking mechanism 2 are accommodated in the lock case 8, wherein an inlet area 9 forms a recess in the lock case 8 to enable insertion of the lock holder. By means of the bevel 10, 11, the motor vehicle lock 1 can be mounted in the motor vehicle.

In addition to the locking mechanism already explained, the motor vehicle lock 1 has a closing device 23, wherein only a closing lever 24 and a closing pawl 25 of the closing device 23 are shown. The closing pawl 25 is in a decoupled position, wherein a driver 26 on the closing pawl 25 engages the pre-latching pawl 4. To actuate the closing pawl 25, the pre-latching pawl 4 has a driving contour 27 into which the driver 26 of the closing pawl 25 engages. In this embodiment, the closing pawl 25 is arranged above the pre-latching pawl 4, and the driver 26 extends in the direction of the pre-latching pawl 4, so that an interaction between the driver 26 and the driver contour 27 is possible.

The closing lever 24 is mounted in the motor vehicle lock 1 so as to be pivotable about its axis 28, wherein the axis 28 is arranged in a fixed position in the motor vehicle lock 1. Thus, the closing lever 24 is able to pivot about the axis 28 in the direction of the arrow P4 and to move the closing pawl 25 accordingly. For this purpose, the closing pawl 24 is accommodated in the closing lever 24 so as to be pivotable about the axis 29.

The closing lever 24 is shown in its initial position A, wherein the initial position is indicated by the dash-dotted line. The initial position designates the position of the closing lever 24, in which the closing pawl 25 is decoupled from the rotary latch 3 or in which the closing pawl 25 is able to engage in the movement region of the rotary latch and in particular in the pre-latching element 17. However, the closing pawl 25 is held out of engagement with the pre-latching element 17 or the rotary latch 3 by means of the driver 26 and in interaction with the pre-latching pawl 4.

Figure 2:
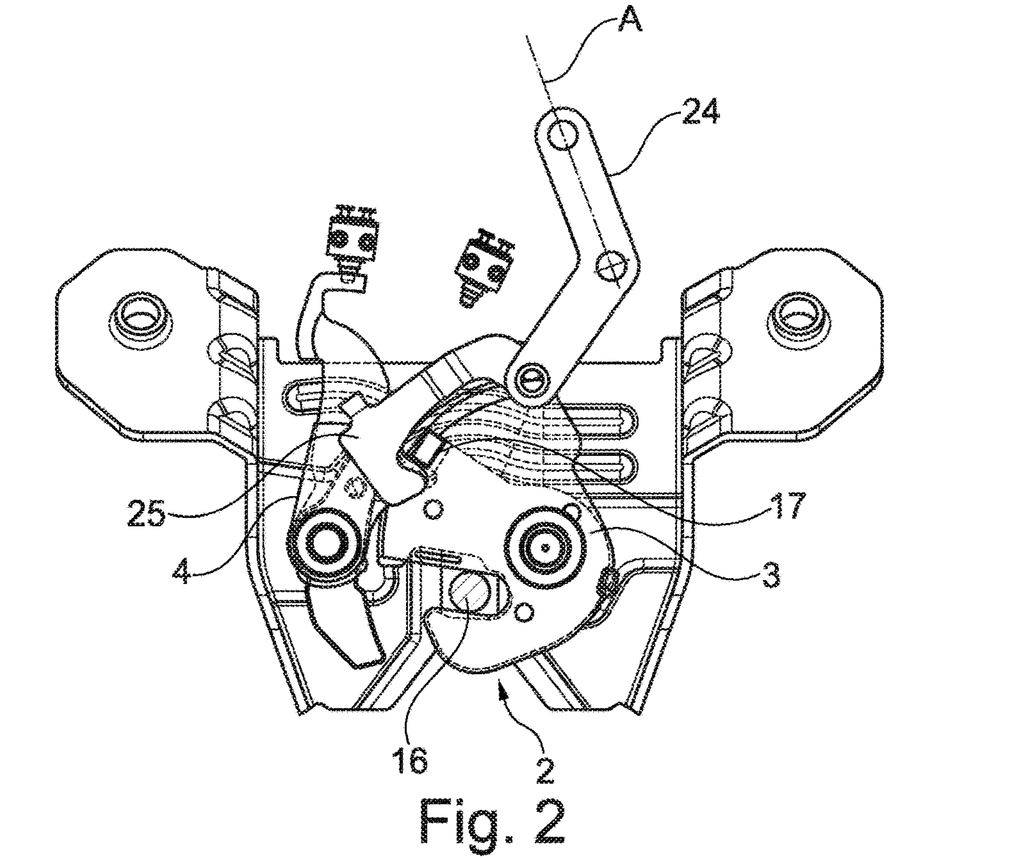
FIG. 2 shows the motor vehicle lock according to the invention as shown in FIG. 1 in a pre-latching position.

FIG. 2 shows the pre-latching position of the locking mechanism 2. For this purpose, a lock holder 16 moves relative to the motor vehicle lock 1 and moves the rotary latch 3 clockwise into its latching position. Thus, what is shown is the pre-latching position of the locking mechanism 2, wherein the pawl 4 rests on the pre-latching element 17 and holds the rotary latch 2 in its pre-latching position. It can be clearly seen that the pre-latching pawl 4 has brought the closing pawl 25 into engagement with the pre-latching element 17. That is, in the pre-latching position of the locking mechanism 2 the closing pawl 25 is able to engage with the angled region, i.e. the pre-latching element 17 of the rotary latch 3.

Figure 3:
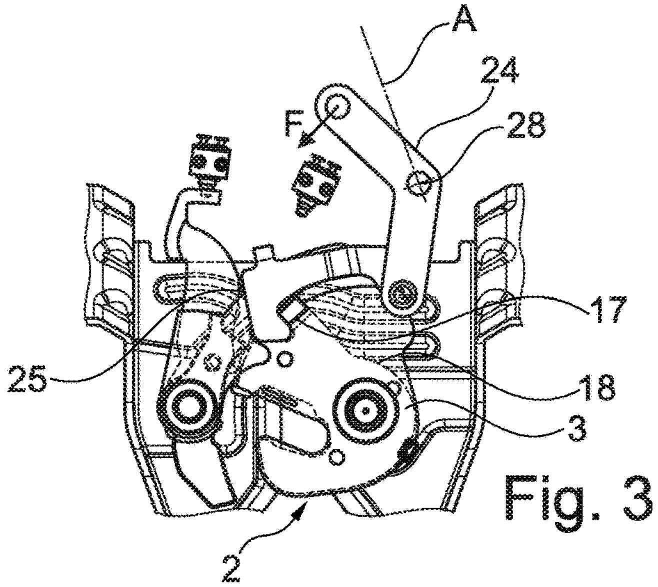
FIG. 3 shows the motor vehicle lock according to the invention in a detailed view, showing the closing process.
Figure 4:
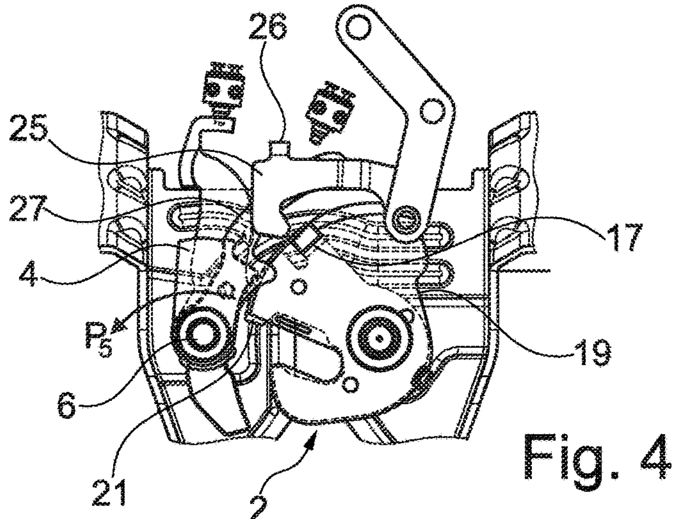
FIG. 4 shows the decoupled closing drive, or the decoupled closing pawl, in case of interruption of the closing process.

FIG. 3 shows an intermediate position of the rotary latch 3, i.e. a position of the rotary latch between the pre-latching position and the main latching position of the locking mechanism 2. This point in time is reached by applying a force F to the closing lever 24 and performing a counterclockwise movement about the axis 28. The closing pawl 25 takes the pre-latching element 17 with it and moves the rotary latch in the direction of its main latching position.

If it is now detected by a control system that the closing process, as shown in FIG. 3, is to be interrupted, the pre-latching pawl 4 is moved in the direction of the arrow P5 about the axis 6 and the closing pawl 25 is brought out of engagement with the pre-latching element 17. The closing process is interrupted and the locking mechanism 2 can be opened again. To decouple the closing pawl 25 from the pre-latching element 17, the closing pawl 25 is disengaged from the pre-latching element 17 by means of the driver 26 and the control contour 27. The closing process can be interrupted and the vehicle lock can be opened.

Figure 5:
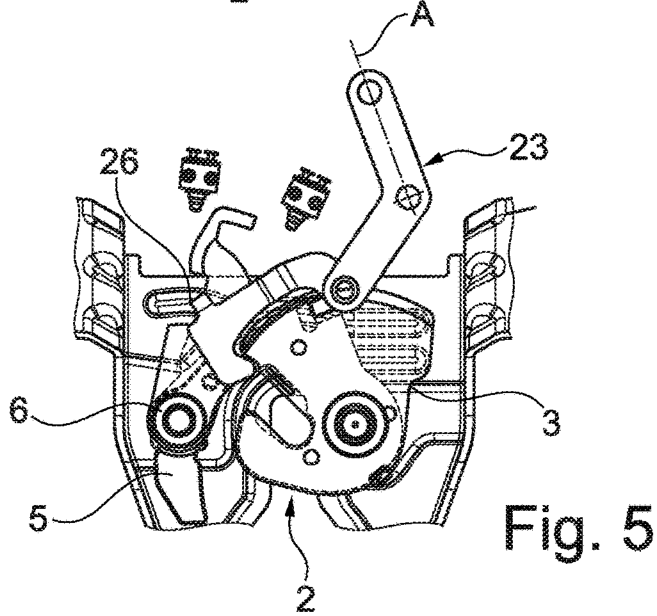
FIG. 5 shows the main latching position of the locking mechanism in a plan view of the motor vehicle lock according to FIG. 1.

FIG. 5 shows the main latching position of the locking mechanism 2. That is, FIG. 5 shows the position of the rotary latch 3 that the rotary latch assumes after it has been completely closed by means of the closing device 23. The main latching pawl 5 now rests on the main latching element 21 and blocks the rotational movement of the rotary latch in the opening direction. The closing pawl 25 is situated with the driver 26 in such a position that by moving the pre-latching pawl 4 counterclockwise about the axis 6, the locking mechanism can be unlocked and the closing pawl 25 can be moved out of engagement, out of the region of engagement with the pre-latching element 17. In addition, the driving of the main latching pawl by the pre-latching pawl 4 enables the rotary latch 3 to be completely unlocked and uncoupled.

LIST OF REFERENCE SIGNS

1 Motor vehicle lock
2 Locking mechanism
3 Rotary latch
4 Pre-latching pawl
5 Main latching pawl
6, 7, 28, 29 Axis
8 Lock case
9 Inlet area
10, 11 Bevels
16 Lock holder
17 Pre-latching element
18 Metal main body
19 Plastic casing
21 Main latching
22 Housing
23 Closing device
24 Closing lever
25 Closing pawl
26 Driver
27 Driving contour
P4, P5 Arrow
F Force

The invention claimed is:

1. A lock for a motor vehicle comprising:

a closing device including a closing pawl, a locking mechanism including a rotary latch including a metal main body having an angled region that forms a pre-latching element, and a pre-latching pawl and a main latching pawl, wherein the rotary latch is latched in a pre-latching position and in a main latching position, wherein the pre-latching element of the locking mechanism is formed by the angled region of the metal main body of the rotary latch, wherein the angled region is placed in engagement with the closing pawl of the closing device, wherein the closing device further includes a closing lever and the closing pawl is arranged pivotably on the closing lever, and wherein the closing pawl includes a driver protrusion that selectively engages a drive contour on the pre-latching pawl to position the drive protrusion relative to the angled region.

2. The lock for a motor vehicle according to claim 1, wherein the closing pawl is configured to be actuated by at least one the rotary latch, the pre-latching pawl and the main latching pawl.

3. The lock for a motor vehicle according to claim 1, wherein the closing pawl is actuated by the pre-latching pawl.

4. The lock for a motor vehicle according to claim 1, wherein the closing pawl is released from engagement with the rotary latch by the pre-latching pawl.

5. The lock for a motor vehicle according to claim 1, wherein the closing pawl is released from engagement with the rotary latch by the pre-latching pawl.

6. The lock for a motor vehicle according to claim 1, wherein the pre-latching pawl is configured to be actuated independently of the main latching pawl.

7. The lock for a motor vehicle according to claim 1, wherein the pre-latching pawl is configured to unlock the locking mechanism and to release the closing pawl from an engagement region with the rotary latch.

8. The lock for a motor vehicle according to claim 1, wherein the main latching pawl is spring-loaded.

9. The lock for a motor vehicle according to claim 1, wherein the pre-latching pawl is spring-loaded.

10. The lock for a motor vehicle according to claim 1, wherein the rotary latch includes a beveled region.

11. The lock for a motor vehicle according to claim 1, wherein the driving contour is configured to hold the closing pawl at a distance from the angled region of the metal body of the rotary latch.

12. The lock for a motor vehicle according to claim 1, wherein the pre-latching pawl is configured unlock the locking mechanism from the pre-latching position.

13. The lock for a motor vehicle according to claim 1, wherein the pre-latching pawl is configured unlock the locking mechanism from the main latching position.

14. The lock for a motor vehicle according to claim 10, wherein the beveled region of the rotary latch engages with the pre-latching pawl such that the pre-latching position is achieved.

* * * * *